(12) United States Patent
Tahara et al.

(10) Patent No.: US 7,674,856 B2
(45) Date of Patent: Mar. 9, 2010

(54) ELASTOMER COMPOSITION AND PRESSURE-SENSITIVE ADHESIVES MADE BY USING SAME

(75) Inventors: Takeshi Tahara, Kanagawa (JP); Takeshi Kawanabe, Kanagawa (JP)

(73) Assignee: Zeon Corporation, Tokyo (JP)

( * ) Notice: Subject to any disclaimer, the term of this patent is extended or adjusted under 35 U.S.C. 154(b) by 213 days.

(21) Appl. No.: 12/017,965

(22) Filed: Jan. 22, 2008

(65) Prior Publication Data
US 2008/0125545 A1     May 29, 2008

Related U.S. Application Data

(63) Continuation of application No. 10/487,881, filed as application No. PCT/JP02/08634 on Aug. 28, 2002, now abandoned.

(30) Foreign Application Priority Data

Aug. 29, 2001 (JP) ............... 2001-260193
Jun. 25, 2002 (JP) ............... 2002-184833

(51) Int. Cl.
*C08L 53/02* (2006.01)
(52) U.S. Cl. .................. 525/89; 525/98; 525/99
(58) Field of Classification Search ............ 525/88, 525/98, 99
See application file for complete search history.

(56) References Cited

U.S. PATENT DOCUMENTS

| 4,181,635 A | 1/1980 | Takamatsu et al. |
|---|---|---|
| 5,292,806 A | 3/1994 | Diehl et al. |
| 5,427,850 A | 6/1995 | Gotoh et al. |
| 5,468,237 A | 11/1995 | Miller et al. |
| 5,500,293 A | 3/1996 | Lau et al. |
| 5,869,562 A | 2/1999 | Lindquist et al. |
| 5,885,908 A | 3/1999 | Jaeger et al. |
| 5,891,957 A | 4/1999 | Hansen et al. |
| 2005/0013996 A1 | 1/2005 | Hatfield |

FOREIGN PATENT DOCUMENTS

| JP | 60-223880 A | 11/1985 |
|---|---|---|
| JP | 60-226578 A | 11/1985 |
| JP | 1-213380 A | 8/1989 |
| JP | 63-178187 A | 7/1998 |
| WO | WO-91/02039 A1 | 2/1991 |
| WO | WO-97/30844 A1 | 8/1997 |

OTHER PUBLICATIONS

Burglund, Polymer Engineering and Science, Sep. 1993, vol. 33, No. 18, p. 1195-1203.
Kane et al., Mat. Res. Soc. Symp. Proc., vol. 461, p. 75-80, 1997.

*Primary Examiner*—Jeffrey C Mullis
(74) *Attorney, Agent, or Firm*—Birch, Stewart, Kolasch & Birch LLP

(57) ABSTRACT

A process for the production of a pressure-sensitive adhesive composition is provided comprising (1) forming an elastomer composition by mixing in the form of a solution, 33.5 to 95% by weight of an aromatic vinyl-isoprene block copolymer (a) having two or more poly(aromatic vinyl) blocks, 0 to 47.5% by weight of an aromatic vinyl-isoprene diblock copolymer (b), and 5 to 33% by weight of isoprene homopolymer (c) having a weight average molecular weight of 20,000 to 100,000, wherein the elastomer composition has a content of aromatic vinyl monomer unit of 14 to 50% by weight, (2) separating the elastomer composition from the solvent, (3) drying the elastomer composition, and (4) blending a petroleum resin with the elastomer composition made by steps (1)-(3), wherein the amount of the petroleum resin is 10 to 500 parts by weight based on 100 parts by weight of the elastomer composition.

15 Claims, No Drawings

ELASTOMER COMPOSITION AND PRESSURE-SENSITIVE ADHESIVES MADE BY USING SAME

CROSS-REFERENCE TO RELATED APPLICATIONS

This application is a Continuation application of U.S. application Ser. No. 10/487,881, filed on Feb. 26, 2004 now abandoned, which is a 35 USC 371 application of International Application PCT/JP02/08634, filed on Aug. 28, 2002, which claims the benefit of Japanese application 2001-260193, filed Aug. 29, 2001, and Japanese application 2002-184833, filed Jun. 25, 2002, each of which are hereby incorporated by reference as if fully set forth herein.

TECHNICAL FIELD

The present invention relates to an elastomer composition and to a pressure-sensitive adhesive composition. More particularly, the invention relates to a pressure-sensitive adhesive composition which is excellent in tackiness at low temperatures, peel strength at ordinary temperatures, and holding power at high temperatures and which is, when applied to pressure-sensitive adhesive labels, excellent in both pressure-sensitive adhesive properties and die-cuttability, and relates to an elastomer composition for providing the pressure-sensitive adhesive composition.

BACKGROUND ART

Pressure-sensitive adhesive tapes such as packing tapes and surface-protective tapes and pressure-sensitive adhesive labels, seals, sheets, etc. for industrial and office use are produced by applying a pressure-sensitive adhesive composition mainly comprising an elastomer and a tackifier resin onto a backing support such as kraft paper, polyester cloth and polyethylene film.

In recent years, use of a hot-melt and solvent-free pressure-sensitive adhesive composition has been recommended from the viewpoint of regulations for environmental protection, energy-saving, resources-saving, etc. In this connection, a styrene-isoprene-styrene block copolymer has been widely employed as the elastomer for use in such a pressure-sensitive adhesive composition.

Pressure-sensitive adhesive compositions are required to have excellent pressure-sensitive adhesive properties such as tackiness, peel strength and holding power. Particularly, demand exists for a pressure-sensitive adhesive composition which is excellent in the tackiness at low temperatures, the peel strength at ordinary temperatures and the holding power at high temperatures. Extensive studies have been made to enhance these pressure-sensitive adhesive properties.

For example, Japanese Patent Application Laid-Open Nos. 63-178187 and 63-178188 disclose a pressure-sensitive adhesive composition containing a styrene-isoprene-styrene block copolymer and a styrene-isoprene diblock copolymer. The disclosed pressure-sensitive adhesive composition exhibits a relatively high peel strength at ordinary temperatures, but is unsatisfactory in the tackiness at low temperature or the holding power at high temperatures.

The production of a pressure-sensitive adhesive label generally includes a step of die-cutting a pressure-sensitive adhesive sheet adhered to a releasing sheet into the shape of intended pressure-sensitive adhesive label. When a pressure-sensitive adhesive composition having poor die-cuttability is employed in this step, the cutting of the pressure-sensitive adhesive sheet cannot be attained successfully. Thus, the resultant pressure-sensitive adhesive labels become stuck to one another, thereby considerably reducing the product value, and in addition, the pressure-sensitive adhesive composition adheres to the die, thereby adversely affecting the subsequent cutting operations. To solve the above problems, various studies have been made to improve the die-cuttability.

For example, U.S. Pat. No. 5,290,842 proposes a pressure-sensitive adhesive composition containing a styrene-isoprene-styrene block copolymer and a styrene-butadiene-styrene block copolymer. Japanese Patent Application Laid-Open No. 2001-504519 discloses a pressure-sensitive adhesive composition comprising a styrene-isoprene-styrene block copolymer, a styrene-isoprene diblock copolymer and a tackifier resin, which exhibits a single glass transition temperature. However, the proposed pressure-sensitive adhesive compositions are insufficient in the improvement of die-cuttability or reduced in the pressure-sensitive adhesive properties, thereby failing to be excellent in both the pressure-sensitive adhesive properties and the die-cuttability.

DISCLOSURE OF THE INVENTION

In view of the foregoing, an object of the present invention is to provide a pressure-sensitive adhesive composition which is excellent in the tackiness at low temperatures, the peel strength at ordinary temperatures and the holding power at high temperatures, and which is, when applied to pressure-sensitive adhesive labels, excellent in both the pressure-sensitive adhesive properties and the die-cuttability. Another object of the invention is to provide an elastomer composition for producing the pressure-sensitive adhesive composition.

As a result of extensive studies, the inventors have found that an elastomer composition and a pressure-sensitive adhesive composition for attaining the above objects can be obtained by employing an elastomer composition comprising a specific aromatic vinyl-isoprene block copolymer and polyisoprene having a specific weight average molecular weight and by regulating the content of the aromatic vinyl monomer unit in the composition within a specific range. The present invention has been accomplished on the basis of this finding.

Accordingly, the present invention provides an elastomer composition which comprises 33.5 to 95% by weight of an aromatic vinyl-isoprene block copolymer (a) having two or more poly(aromatic vinyl) blocks, 0 to 47.5% by weight of an aromatic vinyl-isoprene diblock copolymer (b), and 5 to 33% by weight of polyisoprene (c) having a weight average molecular weight of 20,000 to 100,000, and which has a content of aromatic vinyl monomer unit of 14 to 50% by weight based on the total amount of the components (a), (b) and (c).

The present invention also provides a pressure-sensitive adhesive composition comprising the elastomer composition and a tackifier resin.

BEST MODES FOR CARRYING OUT THE INVENTION

The aromatic vinyl-isoprene block copolymer (a) (hereinafter maybe referred to as "component (a)") used in the present invention has two or more poly(aromatic vinyl) blocks. Among such block copolymers, an aromatic vinyl-isoprene block copolymer having two poly(aromatic vinyl) blocks; i.e., a poly(aromatic vinyl)-polyisoprene-poly(aromatic vinyl) triblock copolymer is preferred.

The poly(aromatic vinyl) block in the component (a) is a portion of the polymer chain mainly comprising an aromatic vinyl monomer unit as the constitutional unit. The content of the aromatic vinyl monomer unit in the poly(aromatic vinyl) block is preferably 80% by weight or more, more preferably 100%. If excessively small, the resultant pressure-sensitive adhesive composition may exhibit a poor holding power at high temperatures.

Examples of aromatic vinyl monomers for forming the poly(aromatic vinyl) block of the component (a) include styrene, α-methylstyrene, o-methylstyrene, m-methylstyrene, p-methylstyrene, 2,4-dimethylstyrene, ethylstyrene, and p-tert-butylstyrene, with styrene being preferred.

The poly(aromatic vinyl) block of the component (a) may be a copolymer of the aromatic vinyl monomer and another monomer copolymerizable with the aromatic vinyl monomer, so long as the effect of the present invention is not substantially affected. Preferred examples of the monomers copolymerizable with the aromatic vinyl monomer include conjugated diene monomers such as 1,3-butadiene, isoprene, 2,3-dimethyl-1,3-butadiene, and 1,3-pentadiene.

The weight average molecular weight of the poly(aromatic vinyl) block of the component (a) is preferably 5,000 to 100,000, more preferably 10,000 to 80,000, particularly preferably 12,000 to 70,000. If excessively small, the pressure-sensitive adhesive composition may exhibit a poor holding power at high temperatures, whereas the melt viscosities of the elastomer composition and the pressure-sensitive adhesive composition tend to increase to make the handling thereof difficult, if excessively large.

The ratio (Mw/Mn) of the poly(aromatic vinyl) block in the component (a), wherein Mw is the weight average molecular weight thereof and Mn is the number average molecular weight thereof, is preferably 2 or less, more preferably 1.5 or less. A small ratio gives a pressure-sensitive adhesive composition exhibiting a more excellent holding power at high temperatures.

The polyisoprene block in the component (a) is a portion of the polymer chain mainly comprising an isoprene unit as the constitutional unit. The content of isoprene unit in the polyisoprene block is preferably 80% by weight or more, more preferably 100%. If excessively small, the pressure-sensitive adhesive composition may exhibit a poor tackiness at low temperatures.

The polyisoprene block in the component (a) may be a copolymer of isoprene and another monomer copolymerizable with isoprene, so long as the effect of the present invention is not substantially affected. Preferred Examples of the monomers polymerizable with isoprene include the aromatic vinyl monomers mentioned above and conjugated diene monomers other than isoprene such as 1,3-butadiene, 2,3-dimethyl-1,3-butadiene and 1,3-pentadiene.

The content of aromatic vinyl monomer unit in the whole component (a) is generally 15 to 75% by weight, preferably 17 to 50% by weight more preferably 20 to 40% by weight.

The content of unit having a pendant vinyl bond in the isoprene unit of the component (a) is not specifically limited, and generally 50% by weight or less, preferably 20% by weight or less, and more preferably 5 to 10% by weight. Within the above range, a pressure-sensitive adhesive composition exhibiting a more excellent tackiness at low temperatures can be produced.

The weight average molecular weight of the component (a) is preferably 120,000 to 1,200,000, more preferably 140,000 to 1,000,000, particularly preferably 140,000 to 800,000. If excessively small, the pressure-sensitive adhesive composition may exhibit a poor holding power at high temperatures, whereas the melt viscosity tends to increase to make the handling of the composition difficult, if excessively large.

The ratio (Mw/Mn) of the component (a), wherein Mw is the weight average molecular weight thereof and Mn is the number average molecular weight thereof, is preferably 2 or less, more preferably 1.5 or less. A small ratio gives a pressure-sensitive adhesive composition exhibiting a more excellent holding power at high temperatures.

The content of component (a) in the elastomer composition is 33.5 to 95% by weight, preferably 40 to 85% by weight, more preferably 45 to 80% by weight. When the content is excessively small, the holding power of the pressure-sensitive adhesive composition at high temperatures is poor, whereas when the content is excessively large, the tackiness and die-cuttability thereof are poor.

The aromatic vinyl-isoprene diblock copolymer (b) (hereinafter maybe referred to as "component (b)") is a block copolymer having only one poly(aromatic vinyl) block and only one polyisoprene block.

The poly(aromatic vinyl) block in the component (b) is a portion of the polymer chain mainly comprising an aromatic vinyl monomer unit as the constitutional unit. The content of aromatic vinyl monomer unit in the poly(aromatic vinyl) block is preferably 80% by weight or more, more preferably 100%. If excessively small, the resultant pressure-sensitive adhesive composition may exhibit a poor holding power at high temperatures.

Examples of the aromatic vinyl monomers for forming the poly(aromatic vinyl) block of the component (b) include those mentioned in relation to the aromatic vinyl monomers for forming the poly(aromatic vinyl) block of the component (a), with styrene being preferred.

The poly(aromatic vinyl) block of the component (b) may be a copolymer of the aromatic vinyl monomer and another monomer copolymerizable with the aromatic vinyl monomer, so long as the effect of the present invention is not substantially affected. Preferred examples of the monomers copolymerizable with the aromatic vinyl monomer include conjugated diene monomers such as 1,3-butadiene, isoprene, 2,3-dimethyl-1,3-butadiene, and 1,3-pentadiene.

The weight average molecular weight of the poly(aromatic vinyl) block of the component (b) is preferably 5,000 to 100,000, more preferably 10,000 to 80,000, particularly preferably 10,000 to 70,000. If excessively small, the pressure-sensitive adhesive composition may exhibit a poor holding power at high temperatures, whereas the melt viscosities of the elastomer composition and the pressure-sensitive adhesive composition tend to increase to make the handling thereof difficult, if excessively large.

The ratio (Mw/Mn) of the poly(aromatic vinyl) block in the component (b), wherein Mw is the weight average molecular weight thereof and Mn is the number average molecular weight thereof, is preferably 2 or less, more preferably 1.5 or less. A small ratio gives a pressure-sensitive adhesive composition exhibiting a more excellent holding power at high temperatures.

The polyisoprene block in the component (b) is a portion of the polymer chain mainly comprising an isoprene unit as the constitutional unit. The content of isoprene unit in the polyisoprene block is preferably 80% by weight or more, more preferably 100%. If excessively small, the pressure-sensitive adhesive composition may exhibit a poor tackiness at low temperatures.

The polyisoprene block in the component (b) may be a copolymer of isoprene and another monomer copolymerizable with isoprene, so long as the effect of the present invention is not substantially affected. Preferred Examples of the monomers polymerizable with isoprene include the aromatic vinyl monomers mentioned above and conjugated diene monomers other than isoprene such as 1,3-butadiene, 2,3-dimethyl-1,3-butadiene and 1,3-pentadiene.

The content of aromatic vinyl monomer unit in the whole component (b) is generally 15 to 75% by weight, preferably 16 to 55% by weight, more preferably 17 to 50% by weight.

The content of unit having a pendant vinyl bond in the isoprene unit of the component (b) is not specifically limited, and generally 50% by weight or less, preferably 20% by weight or less, and more preferably 5 to 10% by weight. Within the above range, a pressure-sensitive adhesive composition exhibiting an excellent tackiness at low temperatures can be produced.

The weight average molecular weight of the component (b) is preferably 60,000 to 250,000, more preferably 70,000 to 230,000, particularly preferably 80,000 to 220,000. If excessively small, the pressure-sensitive adhesive composition may exhibit a poor holding power at high temperatures, whereas the melt viscosity tends to increase to make the handling of the composition difficult, if excessively large.

The ratio (Mw/Mn) of the component (b), wherein Mw is the weight average molecular weight thereof and Mn is the number average molecular weight thereof, is preferably 2 or less, more preferably 1.5 or less. A small ratio gives a pressure-sensitive adhesive composition exhibiting a more excellent holding power at high temperatures.

The content of component (b) in the elastomer composition is 0 to 47.5% by weight, preferably 1 to 40% by weight, more preferably 2 to 30% by weight. Within the above range, the resultant pressure-sensitive adhesive composition is excellent in both the holding power at high temperatures and the die-cuttability.

The method for producing the component (a) is not specifically limited, and any conventionally known method can be employed. For example, there can be employed a method where a poly(aromatic vinyl) block and a polyisoprene block are successively polymerized by anionic living polymerization, and a method where respective block copolymers having a living active terminal are first produced and then coupled with each other in the presence of a coupling agent.

The method for producing the component (b) is not specifically limited, and any conventionally known method can be employed. For example, there can be employed a method where a poly(aromatic vinyl) block and a polyisoprene block are successively polymerized by anionic living polymerization.

The components (a) and (b) may be produced separately in the above manner. Alternatively, as mentioned below, the respective polymerization steps may be combined to produce the components (a) and (b) as a mixture by a single step of anionic living polymerization.

In a first step, a poly(aromatic vinyl) block having a living active terminal is produced by polymerizing an aromatic vinyl monomer in a polymerization solvent in the presence of an anionic polymerization initiator. In a second step, an aromatic vinyl-isoprene diblock copolymer having a living active terminal is produced by polymerizing isoprene from the living active terminal of the poly(aromatic vinyl) block. In a third step, a coupled aromatic vinyl-isoprene-aromatic vinyl block copolymer (corresponding to the component (a)) is produced by reacting a portion of the aromatic vinyl-isoprene diblock copolymer having a living active terminal with a coupling agent. In a fourth step, an aromatic vinyl-isoprene diblock copolymer (corresponding to the component (b)) is produced by deactivating the living active terminal of the rest of the aromatic vinyl-isoprene diblock copolymer having a living active terminal by a polymerization inhibitor. Each of the first to fourth steps will be described in detail below in this order.

In the first step, a poly(aromatic vinyl) block having a living active terminal is produced by polymerizing an aromatic vinyl monomer in a polymerization solvent in the presence of an anionic polymerization initiator.

The polymerization solvent is not specifically limited so long as it is inert to the polymerization initiator. For example, linear hydrocarbon solvents, cyclic hydrocarbon solvents and mixtures thereof can be employed. Examples of the linear hydrocarbon solvents include n-butane, isobutane, n-hexane, 1-butene, isobutylene, trans-2-butene, cis-2-butene, 1-pentene, trans-2-pentene, cis-2-pentene, n-pentane, trans-2-pentane, neo-pentane, and mixtures thereof. Examples of the cyclic hydrocarbon solvents include benzene, toluene, xylene, and cyclohexane. A mixture of the linear hydrocarbon solvent and the cyclic hydrocarbon solvent is preferably used, because the polymerization temperature and the molecular weight of polymer can be easily controlled. The mixing ratio by weight is preferably 5:95 to 50:50, more preferably 10:90 to 40:60. The overall amount of the polymerization solvent used through the first to fourth steps is generally 100 to 1,000 parts by weight, preferably 150 to 400 parts by weight based on the 100 parts by weight of the total amount of the monomers used.

The anionic polymerization initiator is not specifically limited, and any known initiator for use in the polymerization of an aromatic vinyl monomer and isoprene may be used. Examples thereof include organic monolithium initiators such as methyllithium, n-propyllithium, n-butyllithium, and sec-butyllithium, with n-butyllithium being preferred. The amount of the polymerization initiator may be appropriately determined by a known method so as to produce a polymer having a predetermined weight average molecular weight.

The polymerization is preferably carried out in the presence of a polar compound, because the polymerization rate can be easily controlled to produce a polymer having a narrow molecular weight distribution. The polar compound referred to herein is a compound preferably having a relative dielectric constant of 2.5 to 5.0 at 25° C., and is preferably an aromatic ether, an aliphatic ether or a tertiary amine. Examples of preferred polar compounds include aromatic ethers such as diphenyl ether and anisole; aliphatic ethers such as diethyl ether and dibutyl ether; tertiary monoamines such as trimethylamine, triethylamine and tripropylamine; and tertiary polyamines such as tetramethylethylenediamine and tetraethylethylenediamine, with tetramethylethylenediamine being preferred.

The amount of the polar compound to be used is preferably 0.05 to 0.5 mol, more preferably 0.01 to 0.1 mol based on one mole of the anionic polymerization initiator.

In the second step, an aromatic vinyl-isoprene diblock copolymer having a living active terminal is produced by polymerizing isoprene from the living active terminal of the poly(aromatic vinyl) block. In this step, the polymerization is preferably carried out by continuously adding isoprene in order to prevent abrupt generation of the reaction heat.

In the third step, a coupled aromatic vinyl-isoprene-aromatic vinyl block copolymer (corresponding to the component (a)) is produced by reacting a portion of the aromatic vinyl-isoprene diblock copolymer having a living active terminal with a coupling agent.

The coupling agent is a compound having two or more sites which can be bonded to polymer molecules by the reaction with the living active terminals of the polymer molecules.

Examples of bi-functional coupling agents having two reactive functionalities include bi-functional halosilanes such as dichlorosilane, monomethyldichlorosilane, and dimethyldichlorosilane; bi-functional alkoxysilanes such as diphenyldimethoxysilane and diphenyldiethoxysilane; bi-functional haloalkanes such as dichloroethane, dibromoethane, methylene chloride, and dibromomethane; and bi-functional tin halides such as dichlorotin, monomethyldichlorotin, dimethyldichlorotin, monoethyldichlorotin, diethyldichlorotin, monobutyldichlorotin, and dibutyldichlorotin; benzoic acid; CO; and 2-chloropropene.

Examples of tri- or more functional coupling agents having three or more reactive sites include tri-functional haloalkanes such as trichloroethane and trichloropropane; tetra-functional halosilane such as tetrachlorosilane and tetrabromosilane; tetra-functional alkoxysilanes such as tetramethoxysilane, tetraethoxysilane, and phenyltrimethoxysilane; and tetra-functional tin compounds such as tetrachlorotin and tetrabromotin.

Of these coupling agents, the bi-functional coupling agents are preferred, with dimethyldichlorosilane being more preferred. The amount of the coupling agent to be used may be appropriately determined so as to produce the coupled aromatic vinyl-isoprene-aromatic vinyl block copolymer (corresponding to the component (a)) in a desired amount.

In the fourth step, an aromatic vinyl-isoprene diblock copolymer (corresponding to the component (b)) is produced by deactivating the living active terminal of the rest of the aromatic vinyl-isoprene diblock copolymer having a living active terminal by a polymerization inhibitor.

Any polymerization inhibitor generally used in anionic living polymerization may be used, and examples thereof include water; alcohols such as methyl alcohol and ethyl alcohol; inorganic acids and organic acids such as hydrochloric acid and acetic acid.

Following the above steps, a solution containing the components (a) and (b) is produced. An antioxidant may be added to the solution, if necessary. Subsequently, the resultant polymers are separated from the solution by a known polymer separation method such as steam stripping and then dried thereby to obtain a mixture of the components (a) and (b).

The above production of the mixture of the components (a) and (b) is preferably carried out while controlling the ratio of the component (a) to the total of the components (a) and (b) within 50% by weight or more, preferably 60% by weight or more, and particularly preferably 70% by weight or more. Within the above range, an elastomer composition having a desired chemical composition is produced without adding a separately prepared component (a). The ratio may be controlled by changing the amount of coupling agent used.

The weight average molecular weight of the polyisoprene (c) used in the present invention (hereinafter maybe referred to as "component (c)") is 20,000 to 100,000, preferably 25,000 to 95,000, more preferably 30,000 to 90,000. If excessively small, the resultant pressure-sensitive adhesive composition is poor in the holding power at high temperatures and die-cuttability, whereas the pressure-sensitive adhesive composition is poor in the die-cuttability and the melt viscosities of the elastomer composition and the pressure-sensitive adhesive composition increase to make the handling thereof difficult, if excessively large.

The ratio (Mw/Mn) of the component (c), wherein Mw is the weight average molecular weight thereof and Mn is the number average molecular weight thereof, is preferably 2 or less, more preferably 1.5 or less. A small ratio gives a pressure-sensitive adhesive composition exhibiting a more excellent holding power at high temperatures.

The polymer chain of the component (c) contains the isoprene unit as the main constitutional unit. The content of isoprene unit of the component (c) is preferably 80% by weight or more, more preferably 100%. If excessively small, the resultant pressure-sensitive adhesive composition may exhibit a poor tackiness at low temperatures.

The component (c) is preferably an isoprene homopolymer. However, the component (c) may be a copolymer of isoprene and another monomer copolymerizable with isoprene, so long as the effect of the present invention is not substantially affected. Examples of preferred monomers polymerizable with isoprene include the aromatic vinyl monomers mentioned above and conjugated diene monomers other than isoprene such as butadiene and 1,3-pentadiene.

The content of unit having a pendant vinyl bond in the isoprene unit of the component (c) is not specifically limited, and generally 50% by weight or less, preferably 20% by weight or less, and more preferably 5 to 10% by weight. Within the above range, a pressure-sensitive adhesive composition exhibiting a more excellent tackiness at low temperatures can be produced.

The method for producing the component (c) is not particularly limited, and any conventionally known method can be employed. For example, there can be employed a method where isoprene is polymerized in a polymerization solvent in the presence of the anionic polymerization initiator described above.

The content of component (c) in the elastomer composition is 5 to 33% by weight, preferably 10 to 31.5% by weight, more preferably 15 to 30% by weight. If excessively small, the die-cuttability are poor and the melt viscosity of the pressure-sensitive adhesive composition increases to make the handling thereof difficult, whereas the pressure-sensitive adhesive composition exhibits a poor holding power at high temperatures, if excessively large.

It is essential for the elastomer composition of the present invention that the content of aromatic vinyl monomer unit therein is 14 to 50% by weight based on the total amount of the components (a), (b), and (c). The content is preferably 15 to 35% by weight, more preferably 17 to 25% by weight. When the content is excessively small, the resultant pressure-sensitive adhesive composition exhibits a poor holding power at high temperatures, whereas when the content is excessively large, the pressure-sensitive adhesive composition exhibits a poor tackiness at low temperatures.

The method for producing the elastomer composition of the present invention is not particularly limited. For example, there can be employed a method where the components (a), (b), and (c) each having been separately produced or obtained are kneaded in predetermined proportions; a method where the components (a), (b), and (c) are mixed in the form of solution in predetermined proportions, and then the polymers are separated by a known method and dried; and a method where the components (a) and (b) are mixed and the resultant mixture is kneaded with the component (c) which is separately produced or obtained.

The elastomer composition of the present invention may contain, if necessary, a conventionally known additive such as antioxidants, UV-absorbers, anti-blocking agents, fillers and pigments in a desired amount.

The pressure-sensitive adhesive composition of the present invention comprises the above elastomer composition and a tackiefier resin.

The tackifier resin is not specifically limited, and known natural resin-based and synthetic resin-based tackifier resins which are conventionally used in pressure-sensitive adhesive compositions may be employed.

Examples of natural resin-based tackifier resins include rosin-based resins and terpene-based resins. Examples of the rosin-based resins include rosins such as gum rosin, tall rosin and wood rosin; modified rosins such as hydrogenated rosin, disproportionated rosin and polymerized rosin; and rosin esters such as glycerin or pentaerythritol esters of modified rosin. Examples of the terpene-based resins include terpene resins based on α-pinene, β-pinene, or dipentene (limonene); aromatic-modified terpene resins; hydrogenated terpene resins; and terpene-phenol resins.

The synthetic resin-based tackifier resins are roughly classified into addition polymerization-type resins and polycondensation-type resins. Examples of the addition polymerization-type resins include petroleum resins such as aliphatic (C5) petroleum resins, aromatic (C9) petroleum resins, copolymer (C5-C9) petroleum resins, hydrogenated petroleum resins and alicyclic petroleum resins; cumarone-indene resins; and pure monomer petroleum resins such as styrene resin and substituted styrene resin. Examples of the polycondensation-type resins include phenol resins such as alkylphenol resins and rosin-modified phenol resins; and xylene resins.

Of the above tackifier resins, preferred are the petroleum resins, more preferred are the aliphatic petroleum resins and the copolymer petroleum resins having an aromatic monomer content of 30% by weight or less; and particularly preferred are the copolymer petroleum resins having an aromatic monomer content of 25% by weight or less.

The blending amount of the tackifier resin is 10 to 500 parts by weight, preferably 50 to 350 parts by weight, more preferably 70 to 250 parts by weight based on 100 parts by weight of the elastomer composition.

The pressure-sensitive adhesive composition of the present invention may contain an elastomer other than the elastomer composition in a desired amount, so long as the effect of the present invention is not substantially affected.

Examples of the elastomers other than the elastomer composition include styrene-butadiene-styrene block copolymers, styrene-ethylene-butylene-styrene block copolymers, styrene-ethylene-propylene-styrene block copolymers, polybutadiene rubbers, polyisoprene rubbers, and natural rubbers.

The pressure-sensitive adhesive composition of the present invention may contain, if necessary, a softener, an antioxidant, a CV-absorber, or a filler.

Examples of the softeners include extension oils such as aromatic process oil, paraffin process oil and naphthene process oil; and liquid polymers such as polybutene and polyisobutylene, with extension oils such as paraffin process oil and naphthene process oil being preferred. The blending amount of the softener is preferably 5 to 500 parts by weight, more preferably 10 to 300 parts by weight, particularly preferably 10 to 150 parts by weight based on 100 parts by weight of the elastomer composition. If excessively small, the melt viscosity of the pressure-sensitive adhesive composition tends to increase to make the handling thereof difficult, whereas the softener tends to easily bleed, if excessively large.

Examples of the antioxidants include hindered phenol compounds such as 2,6-di-tert-butyl-p-cresol and pentaerythrityl tetrakis[3-(3,5-di-tert-butyl-4-hydroxyphenyl)propionate]; thiodicarboxylate esters such as dilauryl thiodipropionate and distearyl thiodipropionate; and phosphites such as tris(nonylphenyl)phosphite and 4,4'-butylidene-bis(3-methyl-6-tert-butylphenyl)ditridecylphosphite. The amount of the antioxidant to be blended may be appropriately determined depending on the characteristics of the antioxidant and the characteristics of the intended pressure-sensitive adhesive composition.

In the pressure-sensitive adhesive composition of the present invention, the frequency giving a tan δ value of 1 at 25° C. is preferably 3 Hz or less, more preferably 2 Hz or less. If the frequency is low, the die-cuttability of the pressure-sensitive adhesive composition is made more excellent thereby to allow the composition to be suitably used for pressure-sensitive adhesive labels.

The pressure-sensitive adhesive composition of the present invention is produced by mixing the components as described above. The production method thereof is not particularly limited, and conventionally known methods may be employed. For example, there can be employed a method where the components are melt-kneaded in nitrogen atmosphere at temperatures as high as about 160 to 180° C.

The pressure-sensitive adhesive composition of the present invention is generally applied to a backing support for its use.

Examples of the backing supports include, but not particularly limited thereto, papers such as kraft paper, Japanese paper, quality paper and synthetic paper; cloths such as cotton cloth, staple fiber cloth and polyester cloth; resin films such as cellophane film, poly(vinyl chloride) film, polypropylene film and polyethylene film; metal foils such as aluminum foil and copper foil; and non-woven fabrics such as polyester non-woven fabric and rayon non-woven fabric.

The surface of the backing support may be pretreated by corona discharge or may be coated with a primer.

The method of applying the pressure-sensitive adhesive composition is not specifically limited, and conventional application methods may be employed. For example, there may be employed a method where a solution of the pressure-sensitive adhesive composition in an organic solvent is applied; a method where a heat-melted pressure-sensitive adhesive composition is directly applied; and a method where an emulsion of the pressure-sensitive adhesive composition in water prepared using an emulsifier is applied, with the direct application method utilizing the heat melting being preferred.

Examples of the organic solvents for dissolving the pressure-sensitive adhesive composition include aliphatic hydrocarbons such as n-hexane and cyclohexane; aromatic hydrocarbons such as benzene, toluene, and xylene; and halogenated compounds thereof.

The present invention will be described in more detail by way of examples. Unless otherwise specified, the "part(s)" and "%" used in examples, comparative examples, and reference examples are on the basis of weight.

The weight average molecular weight of each polymer was determined as a value calibrated by polystyrene standard by high performance liquid gel permeation chromatography using tetrahydrofuran carrier.

The ratio of the component (a) to the component (b) was determined from the peak areas of the components obtained in the high performance liquid gel permeation chromatography.

The chemical composition of each copolymer was determined by $^1$H-NMR.

The tackiness at low temperatures was evaluated by the peeling-off property at 5° C. as follows. At least three hours before the test, a pressure-sensitive adhesive tape cut to 25 mm×70 mm, a corrugated carton board serving as an adherend and a 500-g metal roller were placed in a thermostatic chamber of 5° C. to stabilize their temperatures. In the thermostatic chamber kept at 5° C., the test pressure-sensitive adhesive tape was adhered to the corrugated carton board by rolling the metal roller forth and back once on the test tape stacked to the corrugated carton board. Immediately thereafter, the test pressure-sensitive adhesive tape was peeled quickly at an angle of 90°. By comparison with standard samples, the amount of paper fiber adhered to the peeled test pressure-sensitive adhesive tape was rated into five ranks where rank 5 is adhesion of paper fiber to the whole surface of the test tape and rank 1 is no adhesion of paper fiber. The test was repeated five times for each test sample and the results are shown by the average of the measured values.

The peel strength (N/m) at ordinary temperatures was determined at 23° C. using a stainless steel as the adherend in accordance with PSTC-1 (180° peel strength test prescribed by the American Pressure Sensitive Tape Committee). The rolling ball tack (mm) was determined at 23° C. according to PSTC-6 (tackiness test prescribed by the American Pressure Sensitive Tape Committee).

The holding power at high temperatures was determined using a test pressure-sensitive adhesive tape having a width of 10 mm and a stainless steel as the adherend in accordance with PSTC-7 (holding power test prescribed by the American Pressure Sensitive Tape Committee) in which the time (min) taken to cause peeling was measured under the conditions of a bonded area of 10 mm×25 mm, a load of $3.92 \times 10^4$ Pa and a measuring temperature of 50° C.

The shear adhesion failure temperature was determined using a stainless steel as the adherend under the conditions of a bonded area of 10 mm×25 mm, a load of $3.92 \times 10^4$ Pa and a temperature elevation rate of 0.5° C./min.

The loop tack was determined in accordance with FINAT-1991 FTM-9 (quick-stick tack measurement).

The dynamic viscoelasticity was determined on the 8-mm parallel test tape with an initial gap of 2 mm and a strain of 0.1%. The scanning was carried out while changing the frequency from 1 to 10 Hz by a 1 Hz increment and changing the temperature from −10 to 50° C. by a 5° C. increment. The reference temperature ($T_0$) was set at 25° C. The obtained data were converted into a master curve using time-temperature-superposition (TTS) method. The frequency at which tan δ was 1 at the lower frequency side of the peak of tan δ was regarded as an index of die-cuttability. The lower the frequency, more excellent in the die-cuttability.

REFERENCE EXAMPLE 1

Into a pressure resistant reactor, were charged 112 parts of cyclohexane, 0.000492 part of N,N,N',N'-tetramethylethylenediamine (TMEDA) and 10.2 parts of styrene. Into the mixture, 0.0181 part of n-butyllithium was added as the polymerization initiator under stirring at 40° C. Then, the mixture was heated to 50° C. over one hour under stirring to allow the polymerization to proceed. At this stage, the polymerization conversion of styrene was 100%. The weight average molecular weight of the polystyrene block was determined on the sampled reaction solution by gel permeation chromatography. The results are shown in Table 1.

Then, 37.8 parts of isoprene was added to the pressure resistant reactor over one hour while controlling the temperature of the mixture to 50 to 60° C. After the addition, the mixture was further stirred for one hour to allow the polymerization to proceed. At this stage, the polymerization conversion of isoprene was 100%. The weight average molecular weight of the styrene-isoprene diblock copolymer (corresponding to the component (b)) was determined on the sampled reaction solution by gel permeation chromatography. The results are shown in Table 1.

Then, after adding 0.0173 part of dimethyldichlorosilane as a coupling agent to the pressure resistant reactor, the mixture was stirred for two hours to allow the coupling reaction to proceed, thereby producing a styrene-isoprene-styrene triblock copolymer (corresponding to the component (a)). The polymerization was terminated by the addition of 0.04 part of methanol as a polymerization inhibitor to the pressure resistant reactor and the subsequent sufficient mixing, thereby obtaining an aromatic vinyl-isoprene block copolymer composition I comprising the components (a) and (b) (shown as component (a)+(b) in Table 1). Using the sampled reaction solution, the content of styrene unit in the composition I was determined, and the weight average molecular weight of the whole composition and the weight ratio of the component (a) to the component (b) were determined by gel permeation chromatography. The results are shown in Table 1.

REFERENCE EXAMPLES 2-12

The procedure of Reference Example 1 was repeated except that the amounts of TMEDA, n-butyllithium, styrene, isoprene, dimethyldichlorosilane, and methanol were changed as shown in Table 1, thereby producing the aromatic vinyl-isoprene block copolymer compositions II to XII each comprising the components (a) and (b). The results are shown in Table 1.

TABLE 1

| | Reference Examples | | | | | |
|---|---|---|---|---|---|---|
| | 1 | 2 | 3 | 4 | 5 | 6 |
| Components (a) + (b) | I | II | III | IV | V | VI |
| Polymerization formulation (parts) | | | | | | |
| TMEDA ($\times 10^{-4}$) | 4.92 | 7.28 | 5.23 | 4.92 | 6.97 | 4.92 |
| n-Butyllithium ($\times 10^{-2}$) | 1.81 | 2.67 | 1.92 | 1.81 | 2.56 | 1.81 |
| Styrene | 10.2 | 9.6 | 10.2 | 10.2 | 7.2 | 9.0 |
| Isoprene | 37.8 | 38.4 | 37.8 | 37.8 | 40.8 | 39.0 |
| Dimethyldichlorosilane ($\times 10^{-2}$) | 1.73 | 2.42 | 1.45 | 7.29 | 2.45 | 1.73 |
| Methanol ($\times 10^{-2}$) | 4.00 | 5.88 | 4.22 | 3.98 | 5.63 | 3.98 |
| Composition Whole composition | | | | | | |
| Molecular weight* ($\times 10^5$) | 4.07 | 2.62 | 3.54 | 2.99 | 2.99 | 4.17 |
| Styrene unit content (%) | 21.25 | 20 | 21.25 | 21.25 | 15 | 18.75 |
| Component (a) | | | | | | |
| Molecular weight* ($\times 10^5$) | 4.19 | 2.77 | 4.04 | 4.28 | 3.11 | 4.30 |
| Molecular weight* of polystyrene block ($\times 10^5$) | 0.34 | 0.22 | 0.32 | 0.34 | 0.17 | 0.30 |
| Content (%) | 94 | 89 | 75 | 39 | 92 | 94 |
| Component (b) | | | | | | |
| Molecular weight* ($\times 10^5$) | 2.12 | 1.40 | 20.4 | 2.16 | 1.57 | 2.17 |
| Molecular weight* of polystyrene block ($\times 10^5$) | 0.34 | 0.22 | 0.32 | 0.34 | 0.17 | 0.30 |
| Content (%) | 6 | 11 | 25 | 61 | 8 | 6 |

| | Reference Examples | | | | | |
|---|---|---|---|---|---|---|
| | 7 | 8 | 9 | 10 | 11 | 12 |
| Components (a) + (b) | VII | VII | IX | X | XI | XII |
| Polymerization formulation (parts) | | | | | | |
| TMEDA ($\times 10^{-4}$) | 7.28 | 7.28 | 7.28 | 7.28 | 7.28 | 7.28 |
| n-Butyllithium ($\times 10^{-2}$) | 2.67 | 2.67 | 2.67 | 2.67 | 2.67 | 2.67 |
| Styrene | 11.7 | 10.2 | 11.7 | 17.1 | 8.2 | 7.5 |
| Isoprene | 36.3 | 37.8 | 36.3 | 30.9 | 39.8 | 40.5 |
| Dimethyldichlorosilane | 1.89 | 2.42 | 2.42 | 2.42 | 1.35 | 1.89 |

TABLE 1-continued

| | | | | | | |
|---|---|---|---|---|---|---|
| $(\times 10^{-2})$ Methanol $(\times 10^{-2})$ | 5.88 | 5.88 | 5.88 | 5.88 | 5.88 | 5.88 |
| Composition Whole composition | | | | | | |
| Molecular weight* $(\times 10^5)$ | 2.28 | 2.53 | 2.57 | 2.65 | 1.90 | 2.15 |
| Styrene unit content (%) | 24.3 | 21.25 | 24.3 | 35.7 | 17 | 15.7 |
| Component (a) | | | | | | |
| Molecular weight* $(\times 10^5)$ | 2.68 | 2.66 | 2.70 | 2.79 | 2.54 | 2.52 |
| Molecular weight* of polystyrene block $(\times 10^5)$ | 0.27 | 0.23 | 0.27 | 0.39 | 0.19 | 0.17 |
| Content (%) | 70 | 90 | 90 | 90 | 49 | 70 |
| Component (b) | | | | | | |
| Molecular weight* $(\times 10^5)$ | 1.35 | 1.34 | 1.37 | 1.40 | 1.28 | 1.28 |
| Molecular weight* of polystyrene block $(\times 10^5)$ | 0.27 | 0.23 | 0.27 | 0.39 | 0.19 | 0.17 |
| Content (%) | 30 | 10 | 10 | 10 | 51 | 30 |

*Weight average molecular weight

REFERENCE EXAMPLE 13

Into a pressure resistant reactor, 112 parts of cyclohexane, 0.00279 part of TMEDA and 0.102 part of n-butyllithium were charged. Then, 48 parts of isoprene was added to the mixture over one hour under stirring while raising the temperature from 40° C. to 60° C. After the addition of isoprene, the mixture was further stirred for one hour to proceed the polymerization. At this stage, the polymerization conversion of isoprene was 100%. Thereafter, the polymerization was terminated by the addition of 0.2 part of menthol as a polymerization inhibitor to the pressure resistant reactor and the subsequent sufficient mixing to obtain polyisoprene i. The weight average molecular weight of the polyisoprene i was 57,000.

REFERENCE EXAMPLE 14

The procedure of Reference Example 13 was repeated except for changing the amount of TMEDA to 0.00364 part and that of n-butyllithium to 0.125 part to obtain polyisoprene ii. The weight average molecular weight of the polyisoprene ii was 42,000.

REFERENCE EXAMPLE 15

The procedure of Reference Example 13 was repeated except for changing the amount of TMEDA to 0.0022 part and that of n-butyllithium to 0.0758 part to obtain polyisoprene iii. The weight average molecular weight of the polyisoprene iii was 71,000.

REFERENCE EXAMPLE 16

The procedure of Reference Example 13 was repeated except for changing the amount of TMEDA to 0.00129 part and that of n-butyllithium to 0.0443 part to obtain polyisoprene iv. The weight average molecular weight of the polyisoprene iv was 121,000.

EXAMPLE 1

Into 80 parts by weight of a cyclohexane solution of the aromatic vinyl-isoprene block copolymer composition I having a polymer concentration of 30%, were added under mixing 20 parts by weight of a 30% cyclohexane solution of polyisoprene i and 0.3 part of 2,6-di-tert-butyl-p-cresol as an antioxidant to prepare a solution. The solution was added little by little to hot water heated to 85 to 95° C. to vaporize the solvent. The resultant deposit was pulverized and dried at 85° C. by hot air to obtain an elastomer composition. The chemical composition of the elastomer composition is shown in Table 2.

Into a paddle kneader, was charged 100 parts by weight of the elastomer composition, into which 100 parts by weight of aliphatic petroleum resin (Quintone M100 (trade name), product of Zeon Corporation) as a tackifier resin, 20 parts by weight of naphthene process oil (Shellflex 371 (trade name), product of Shell Chemicals Ltd.) as a softener and one part by weight of Irganox 1010 (trade name, product of Ciba Specialty Chemicals Inc.) as an antioxidant were added. After replacing the atmosphere inside the kneader with nitrogen, the mixture was kneaded at 160 to 180° C. to produce a pressure-sensitive adhesive composition, which was then coated on a polyester film of 25 μm thick in a coating thickness of 25 μm to prepare a pressure-sensitive adhesive sheet. The pressure-sensitive adhesive properties thereof were measured. The results are shown in Table 2.

EXAMPLES 2-3 AND COMPARATIVE EXAMPLES 1-4

Each elastomer composition of the blending formulation shown in Table 2 was prepared. Then, each pressure-sensitive adhesive composition was prepared in the same manner as in Example 1, and the pressure-sensitive adhesive properties thereof were measured. The results are shown in Table 2. In Table 2, the styrene-isoprene-styrene block copolymer XIII (components (a)+(b) in Table 2) was a commercially available Kraton TR1107 (product of Kraton Polymers Ltd.) having a styrene block content of 15%, a polystyrene-calibrated weight average molecular weight (w) of 199,000 and a percent coupling of 80.6%. The "n.d." in Table 2 is "not determined."

TABLE 2

| | Examples | | |
|---|---|---|---|
| | 1 | 2 | 3 |
| Elastomer composition | | | |
| Weight average molecular weight $(\times 10^5)$ | 3.40 | 2.29 | 2.96 |
| Styrene unit content (%) | 17 | 17 | 17 |
| Component (a) + (b) | I | II | III |
| Weight average molecular weight $(\times 10^5)$ | 4.07 | 2.62 | 3.54 |
| Content (%) | 80 | 85 | 80 |
| Component (a) | | | |
| Weight average molecular weight $(\times 10^5)$ | 4.19 | 2.77 | 4.04 |
| Content (%) | 75 | 76 | 60 |
| Component (b) | | | |
| Weight average molecular weight $(\times 10^5)$ | 2.12 | 1.40 | 2.04 |
| Content (%) | 5 | 9 | 20 |
| Component (c) | i | i | i |
| Weight average molecular weight $(\times 10^5)$ | 0.57 | 0.57 | 0.57 |
| Content (%) | 20 | 15 | 20 |
| Pressure-sensitive adhesive composition | | | |
| Low temp. tackiness | 3.7 | 3.8 | 3.9 |

TABLE 2-continued

| (peeling-off property) | | | |
|---|---|---|---|
| Ordinary temp. peel strength (N/m) | 1,050 | 930 | 1,425 |
| High temp. holding power (min) | 970 | 790 | 895 |
| Rolling ball tack (mm) | 44 | 32 | 43 |
| Shear adhesion failure temp. (° C.) | 81.3 | 80.2 | 78.2 |

| | Comparative Examples | | | |
|---|---|---|---|---|
| | 1 | 2 | 3 | 4 |
| Elastomer composition | | | | |
| Weight average molecular weight (×10$^5$) | 1.99 | 2.51 | 2.53 | 2.71 |
| Styrene unit content (%) | 15 | 17 | 12 | 11.25 |
| Component (a) + (b) | XIII | IV | V | VI |
| Weight average molecular weight (×10$^5$) | 1.99 | 2.99 | 2.99 | 4.17 |
| Content (%) Component (a) | 100 | 80 | 80 | 60 |
| Weight average molecular weight (×10$^5$) | n.d. | 4.28 | 3.11 | 4.30 |
| Content (%) Component (b) | 81 | 31 | 74 | 56 |
| Weight average molecular weight (×10$^5$) | n.d. | 2.16 | 1.57 | 2.17 |
| Content (%) | 19 | 49 | 6 | 4 |
| Component (c) | — | i | I | i |
| Weight average molecular weight (×10$^5$) | — | 0.57 | 0.57 | 0.57 |
| Content (%) | 0 | 20 | 20 | 40 |
| Pressure-sensitive adhesive composition | | | | |
| Low temp. tackiness (peeling-off property) | 3 | 3.2 | 4 | 4.4 |
| Ordinary temp. peel strength (N/m) | 600 | 1,660 | 1,120 | 1,020 |
| High temp. holding power (min) | 430 | 95 | 140 | 135 |
| Rolling ball tack (mm) | 55 | 48 | 39 | 35 |
| Shear adhesion failure temp. (° C.) | 72 | 59.5 | 67 | 64 |

The following can be seen from Table 2.

The pressure-sensitive adhesive composition of Comparative Example 1 not containing the component (c) was poor in all the tackiness at low temperatures, the peel strength at ordinary temperatures, and the holding power at high temperatures.

In the pressure-sensitive adhesive composition of Comparative Example 2 prepared using an elastomer composition having a small content of component (a), the pressure-sensitive adhesive composition of Comparative Example 3 prepared from an elastomer composition having a small content of aromatic vinyl monomer unit, and the pressure-sensitive adhesive composition of Comparative Example 4 prepared using an elastomer composition having a large content of component (c), the holding power at high temperatures was poor although the tackiness at low temperatures and the peel strength at ordinary temperatures were good.

In contrast to the comparative examples, the pressure-sensitive adhesive compositions of Examples 1 to 3 according to the present invention were excellent in all the tackiness at low temperatures, the peel strength at ordinary temperatures and the holding power at high temperatures. Furthermore, the pressure-sensitive adhesive compositions of the present invention raised no practical problems in the melt viscosity, etc.

EXAMPLE 4

Into 70 parts by weight of a cyclohexane solution of the aromatic vinyl-isoprene block copolymer composition VII having a polymer concentration of 30%, were added under mixing 30 parts by weight of a 30% cyclohexane solution of polyisoprene ii and 0.3 part of 2,6-di-tert-butyl-p-cresol as an antioxidant to prepare a solution. The solution was added little by little to hot water heated to 85 to 95° C. to vaporize the solvent. After pulverizing the resultant deposit, an elastomer composition and a pressure-sensitive adhesive composition were produced by following the procedure of Example 1. The chemical composition of the elastomer composition is shown in Table 3. The pressure-sensitive adhesive composition was coated on a polyester film of 25 μm thick in a coating thickness of 25 μm to prepare a pressure-sensitive adhesive sheet. The pressure-sensitive adhesive properties and the dynamic viscoelasticity thereof were measured. The results are shown in Table 3.

EXAMPLES 5-8 AND COMPARATIVE EXAMPLES 5-7

In the same manner as in Example 4, each elastomer composition and pressure-sensitive adhesive composition were prepared in the blending formulation shown in Table 3. The chemical compositions of the elastomer compositions and the evaluation results of the pressure-sensitive adhesive properties and dynamic viscoelasticity of the pressure-sensitive adhesive compositions are shown in Table 3.

EXAMPLE 9

The procedure of Example 4 was repeated except for changing the tackifier resin to Quintone D100 (trade name, copolymer-type (C5-C9) petroleum resin produced by Zeon Corporation). The results are shown in Table 3.

EXAMPLE 10

The procedure of Example 7 was repeated except for changing the tackifier resin to Quintone D100 (trade name, copolymer-type ($C_5$-$C_9$) petroleum resin produced by Zeon Corporation). The results are shown in Table 3.

TABLE 3

| | Examples | | | | |
|---|---|---|---|---|---|
| | 4 | 5 | 6 | 7 | 8 |
| Elastomer composition | | | | | |
| Molecular weight* (×10$^5$) | 1.73 | 2.10 | 1.95 | 2.02 | 1.97 |
| Styrene unit content (%) | 17 | 17 | 17 | 17 | 25 |
| Component (a) + (b) | VII | VIII | IX | IX | X |
| Molecular weight* (×10$^5$) | 2.28 | 2.53 | 2.57 | 2.57 | 2.65 |
| Content (%) Component (a) | 70 | 80 | 70 | 70 | 70 |
| Molecular weight* (×10$^5$) | 2.68 | 2.66 | 2.70 | 2.70 | 2.79 |
| Content (%) Component (b) | 49 | 72 | 63 | 63 | 63 |

TABLE 3-continued

| | | | | | |
|---|---|---|---|---|---|
| Molecular weight* (×10$^5$) | 1.35 | 1.34 | 1.37 | 1.37 | 1.40 |
| Content (%) | 21 | 8 | 7 | 7 | 7 |
| Component (c) | ii | Ii | ii | Iii | ii |
| Molecular weight* (×10$^5$) | 0.42 | 0.42 | 0.42 | 0.71 | 0.42 |
| Content (%) | 30 | 20 | 30 | 30 | 30 |
| Pressure-sensitive adhesive composition | | | | | |
| Tackifier resin | M100 | M100 | M100 | M100 | M100 |
| Frequency at tan δ = 1 (Hz) | 1.18 | 2.21 | 0.93 | 1.15 | 0.5 |
| Holding power (min) | 50 | 740 | 60 | 130 | 550 |
| Loop tack | 580 | 590 | 520 | 550 | 620 |

| | Examples | | Comparative Examples | | |
|---|---|---|---|---|---|
| | 9 | 10 | 5 | 6 | 7 |
| Elastomer composition | | | | | |
| Molecular weight* (×10$^5$) | 1.73 | 2.02 | 1.90 | 1.66 | 2.12 |
| Styrene unit content (%) | 17 | 17 | 17 | 11 | 17 |
| Component (a) + (b) | VII | IX | XI | XII | IX |
| Molecular weight* (×10$^5$) | 2.28 | 2.57 | 1.90 | 2.15 | 2.57 |
| Content (%) Component (a) | 70 | 70 | 100 | 70 | 70 |
| Molecular weight* (×10$^5$) | 2.68 | 2.70 | 2.54 | 2.52 | 2.70 |
| Content (%) Component (b) | 49 | 63 | 49 | 49 | 63 |
| Molecular weight* (×10$^5$) | 1.35 | 1.37 | 1.28 | 1.28 | 1.37 |
| Content (%) | 21 | 7 | 51 | 21 | 7 |
| Component (c) | ii | Iii | — | Ii | iv |
| Molecular weight* (×10$^5$) | 0.42 | 0.71 | — | 0.42 | 1.21 |
| Content (%) | 30 | 30 | 0 | 30 | 30 |
| Pressure-sensitive adhesive composition | | | | | |
| Tackifier resin | D100 | D100 | M100 | M100 | M100 |
| Frequency at tan δ = 1 (Hz) | 1.02 | 0.99 | 3.22 | 1.78 | 4.31 |
| Holding power (min) | 45 | 110 | 120 | 5 | 290 |
| Loop tack | 560 | 530 | 480 | 450 | 650 |

*Weight average molecular weight

The following can be seen from Table 3.

The pressure-sensitive adhesive composition of Comparative Example 5 prepared from an elastomer composition not containing the component (c) was high in the frequency at which tan δ was 1 and poor in both the die-cuttability and the loop tack.

The pressure-sensitive adhesive composition of Comparative Example 6 prepared from an elastomer composition having a small content of aromatic vinyl monomer unit were poor in the holding power and the loop tack.

The pressure-sensitive adhesive composition of Comparative Example 7 containing a component (c) having a large molecular weight was high in the frequency at which tan δ was 1 and poor in the die-cuttability.

In contrast to the comparative examples, the pressure-sensitive adhesive compositions of Examples 4 to 10 according to the present invention was low in the frequency at which tan δ was 1 and excellent in the holding power, the loop tack and the die-cuttability.

INDUSTRIAL APPLICABILITY

According to the present invention, there can be provided a pressure-sensitive adhesive composition which is excellent in the tackiness at low temperatures, the peel strength at ordinary temperatures and the holding power at high temperatures, and which are, when applied to adhesive labels, excellent in both the pressure-sensitive adhesive properties and the die-cuttability. Also provided is an elastomer composition for producing the pressure-sensitive adhesive composition. With its excellent pressure-sensitive adhesive properties in a wide temperature range, the pressure-sensitive adhesive composition is applicable to pressure-sensitive adhesive tapes, sheets or labels for packing use, office use, double-coated tape use, masking use or electrical insulation use and to dust rollers. Particularly, the pressure-sensitive adhesive composition is suitably applied to pressure-sensitive adhesive labels because of its excellent die-cuttability.

What is claimed is:

1. A process for producing a pressure-sensitive adhesive composition, said process comprising the following steps:
   (1) making an elastomer composition by mixing in the form of a solution,
      33.5 to 95% by weight of an aromatic vinyl-isoprene block copolymer (a) having two or more poly(aromatic vinyl) blocks,
      0 to 47.5% by weight of an aromatic vinyl-isoprene diblock copolymer (b), and
      5 to 33% by weight of isoprene homopolymer (c) having a weight average molecular weight of 20,000 to 100,000, the total amount of the components (a), (b) and (c) being 100% by weight,
      wherein the elastomer composition has a content of aromatic vinyl monomer unit of 14 to 50% by weight based on the total amount of the components (a), (b) and (c),
   (2) separating the elastomer composition from the solvent,
   (3) drying the elastomer composition, and
   (4) blending a petroleum resin with the elastomer composition made by steps (1)-(3), wherein the amount of the petroleum resin is 10 to 500 parts by weight based on 100 parts by weight of the elastomer composition.

2. The process for producing the pressure-sensitive adhesive composition according to claim 1, wherein the weight average molecular weight of the aromatic vinyl-isoprene block copolymer (a) is 120,000 to 1,200,000.

3. The process for producing the pressure-sensitive adhesive composition according to claim 1, wherein the content of aromatic vinyl monomer unit in the aromatic vinyl-isoprene block copolymer (a) is 17 to 50% by weight.

4. The process for producing the pressure-sensitive adhesive composition according to claim 1, wherein the weight average molecular weight of the aromatic vinyl-isoprene diblock copolymer (b) is 60,000 to 250,000.

5. The process for producing the pressure-sensitive adhesive composition according to claim 1, wherein the content of aromatic vinyl monomer unit in the aromatic vinyl-isoprene diblock copolymer (b) is 16 to 55% by weight.

6. The process for producing the pressure-sensitive adhesive composition according to claim 1, wherein the content of 3,4 bonded isoprene unit of the isoprene homopolymer component (c) is 20% by weight or less.

7. The process for producing the pressure-sensitive adhesive composition according to claim 1, wherein the weight average weight of the isoprene homopolymer (c) is 25,000 to 95,000.

8. The process for producing the pressure-sensitive adhesive composition according to claim 1, wherein the weight average weight of the isoprene homopolymer (c) is 30,000 to 90,000.

9. The process for producing the pressure-sensitive adhesive composition according to claim 1, wherein the composition contains 1 to 40% of the copolymer (b).

10. The process for producing the pressure-sensitive adhesive composition according to claim 1, wherein the composition contains 2 to 30% of the copolymer (b).

11. The process for producing the pressure-sensitive adhesive composition according to claim 1, wherein the composition contains 10 to 31.5% of the isoprene homopolymer (c).

12. The process for producing the pressure-sensitive adhesive composition according to claim 1, wherein the composition contains 15 to 30% of isoprene homopolymer (c).

13. The process for producing the pressure-sensitive adhesive composition according to claim 1, wherein the composition has a content of aromatic vinyl monomer unit of 15 to 35% by weight based on the total amount of the components (a), (b) and (c).

14. The process for producing the pressure-sensitive adhesive composition according to claim 1, wherein the composition has a content of aromatic vinyl monomer unit of 17 to 25% by weight based on the total amount of the components (a), (b) and (c).

15. A process for producing the pressure-sensitive adhesive label which comprises the step of applying a pressure-sensitive adhesive composition made by the process of claim 1 to a backing support.

* * * * *